Jan. 12, 1937.  A. J. McMASTER  2,067,613
ELECTRIC CONTROL DEVICE
Filed Sept. 19, 1932  2 Sheets-Sheet 1
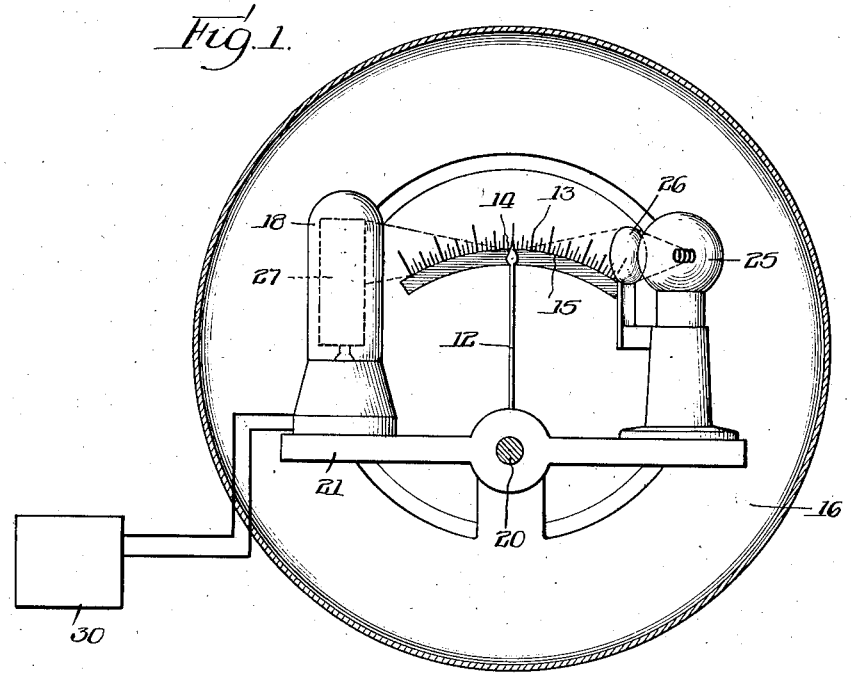
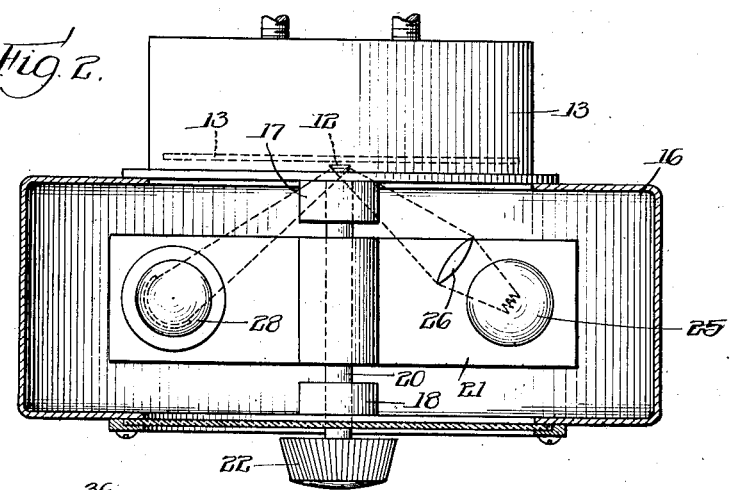
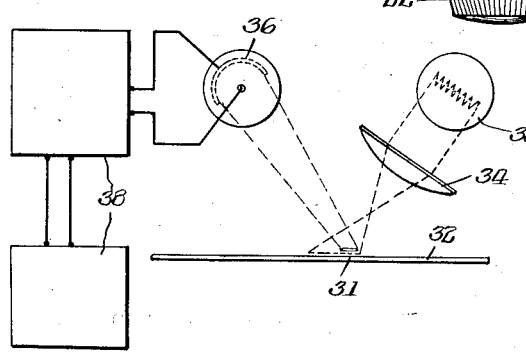
Inventor:
Archie J. McMaster
By: Mueller & McLaughlin
attys Jan. 12, 1937.   A. J. McMASTER   2,067,613
ELECTRIC CONTROL DEVICE
Filed Sept. 19, 1932   2 Sheets-Sheet 2
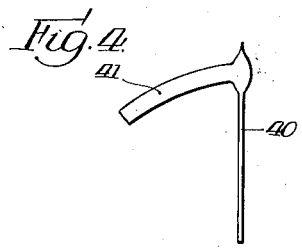
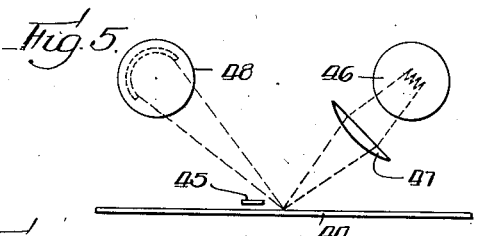
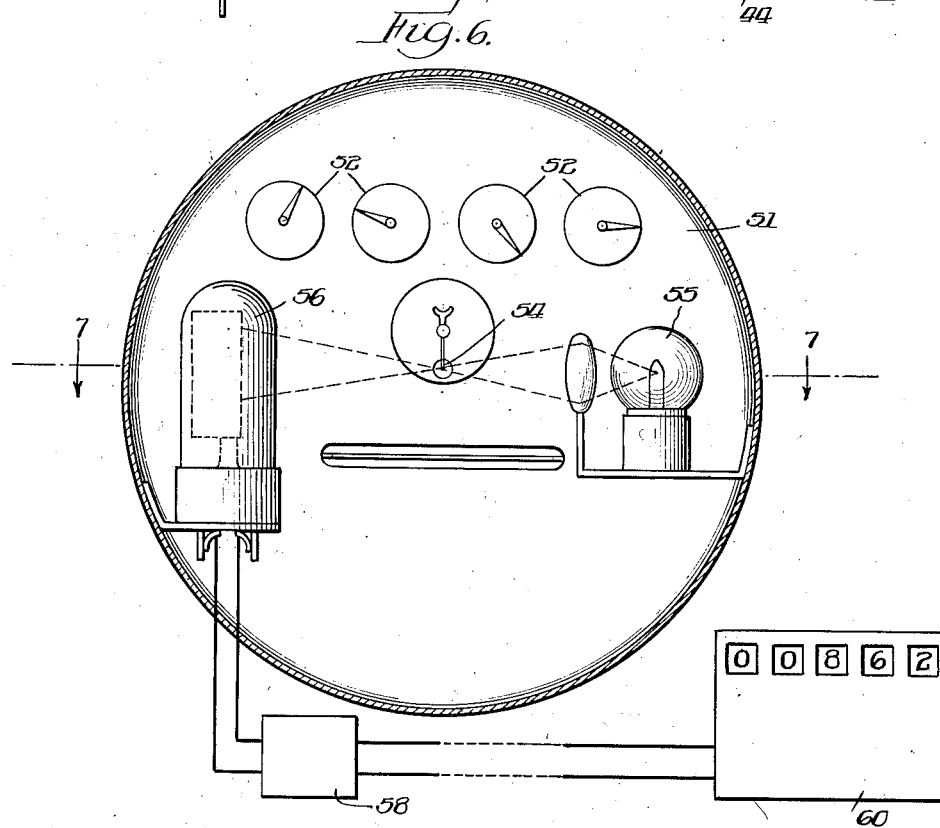
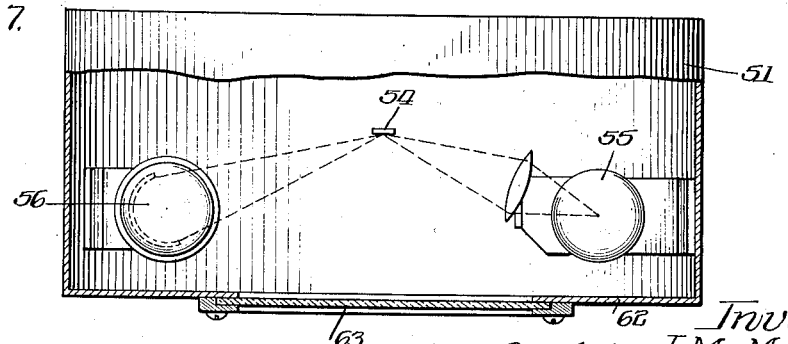

Patented Jan. 12, 1937

2,067,613

UNITED STATES PATENT OFFICE 2,067,613

ELECTRIC CONTROL DEVICE

Archie J. McMaster, Highland Park, Ill., assignor to G. M. Laboratories, Inc., Chicago, Ill.

Application September 19, 1932, Serial No. 633,828

5 Claims. (Cl. 250—41.5)

My present invention relates generally to electric control devices and more particularly to photo-electric control in connection with indicating instruments.

As a general rule, indicating instruments while superior to other types of instruments in accuracy, sensitivity and general reliability are nevertheless limited in their use to applications permitting a manual reading of their indications. Instruments and other devices which are required to perform responsive functions other than the giving of a visual indication are subject to more or less mechanical restraint which seriously impairs their accuracy and sensitivity and renders them less dependable in operation.

Because of this, users of meters, supervisory control devices and the like have often been compelled heretofore to choose a compromise between the precise operation of a purely indicating device and the automatic functions afforded by a less sensitive control scheme.

Indicating devices have been and are at the present time used extensively in applications where additional responsive functions are desired, such as for example, the provision of indicators, recorders and the like at remote points, or the automatic control of certain machine operations.

It is accordingly an object of my present invention to provide means for controlling an electric circuit in response to the operation of a visual indicating device.

It is a further object of my invention to provide means whereby a delicate indicating instrument may, without sacrificing its sensitivity or reliability, control a subordinate device.

A further object is the provision of a supervisory control device of great sensitivity and accuracy of operation.

A further object is the provision of means for controlling a device in response to a predetermined operation of an indicating instrument.

A further object is the provision of a device of the above indicated character adapted to be employed with indicating instruments now in use.

Other objects and advantages will appear as the description proceeds.

In order to acquaint those skilled in the art with the teachings and practice of my invention, I shall now describe certain specific embodiments of the same, reference being had to the accompanying drawings forming a part of this specification, and in which:

Figure 1 is an elevational view of one embodiment of my invention;

Figure 2 is a sectional plan view thereof;

Figure 3 illustrates more or less schematically, a modification of the device of Figures 1 and 2;

Figure 4 is a detail view illustrating a further modification of the device of Figures 1 and 2;

Figure 5 illustrates, schematically, another modification of Figures 1 and 2;

Figure 6 illustrates partly in diagram still another embodiment of the principles of my present invention; and Figure 7 is a section on the line 7—7 of Figure 6.

In Figures 1 and 2, the reference character 11 refers generally to a meter or indicating device such as an electrical instrument, thermometer, pressure gage or the like. The meter 11 is provided with the usual indicating means comprising a pivoted hand or indicating member 12 cooperating with a stationary scale 13. A portion 14 of the front surface of the hand 12 is painted a light color or polished to permit the reflection of light therefrom while an arcuate portion 15 of the scale 13, over which the portion 14 of the hand swings, is darkened to be less reflecting than the portion 14.

Secured to the front of the meter casing in any convenient manner is another case 16 carrying a pair of journals 17 and 18 which support a shaft 20 co-axially with the pivotal mounting of the hand 12. The shaft 20 carries a bar 21 within the case 16 and a portion of the shaft extends through the front of the case to receive a knob 22. The bar 21 carries a light source 25, a mirror 26 and a photoelectric cell or light responsive means 27. The light source 25, together with the lens 26 directs a spot of light to fall on to the darkened portion 15 of the scale 13 or onto the bright portion 14 of the hand 12 when the latter is deflected into the proper position. The photoelectric cell is so positioned on the bar 21 as to intercept the light when reflected from the portion 14 of the hand 12. Connected to the photoelectric cell 27 is a subordinate apparatus 30 arranged to be controlled according to the amount of light entering the cell 27, an electric circuit including an actuatable portion of such apparatus and the cell 25.

The lamp 25, being unenclosed except by the casing 16 will illuminate the interior of the casing including the face of the meter and thereby permit a visual reading of the meter. A part of this general illumination reaching the meter face will be indirect, being reflected from the interior walls of the casing 16. The illumination on the meter face caused by this general flood of light will, of course, be less than the illumination of the concentrated spot of light focused by the lens 26.

In operation the light source 25 and the lens 26 direct a beam of light against the dark portion 15 of the scale 13 to illuminate a small spot thereof, from which a slight amount of light may or may not be reflected into the cell 27. The position of this small spot of light on the scale 13 will correspond to some particular reading of the meter 11, and may be adjusted to any desired reading by rotating the light source 25 and cell 27 by means of the knob 22 to move the light spot to the proper position on the scale. When the hand 12 of the meter is deflected to indicate the reading corresponding to the setting of the spot of light, that is, when the hand 12 intercepts the beam of light, the bright surface 14 thereof reflects a large amount of light into the cell 27. The electrical response of the photo cell to this increase of illumination actuates the subordinate apparatus.

Thus the device may be employed to give an indication or to control a machine operation when a certain condition obtains as determined by the reading of the meter 11. For example, in controlling the filling of containers by weight, the meter 11 would indicate the weight of material in a container and the subordinate apparatus 30 would respond to the actuation of the photo cell 27 to stop the filling apparatus and/or move a conveyor carrying the containers. On the other hand the device may also be applied to a voltmeter so that the hand 12 of the meter lies in the spot of light to illuminate the cell 27 as long as the indication is of the proper value, the apparatus 30 being arranged to actuate a signal whenever the cell is darkened. A warning may be given whenever the indication deviates by a predetermined amount from the proper value.

In Figure 3 I have illustrated a slight modification of the optical system of the device of Figures 1 and 2. A reflecting indicating member 31 co-operates with a relatively non-reflecting scale 32 to give an indication. A light source 33 and a lens 34 direct a beam of light on the scale 32 in such a manner as to provide a rather large spot of light thereon. The light source 33 may be an incandescent lamp provided with an elongated filament in which case an image of the filament may be focused on the scale 32 to provide a light spot elongated in the direction of motion of the indicating member 31. A photoelectric cell 36 is arranged to be illuminated by light reflected by the indicating member 31 and has connected thereto a subordinately controlled apparatus 38.

In operation, the indicating member 31, as it moves across the scale 32 enters one end of the elongated spot and reflects a relatively large amount of light to the photoelectric cell 36 so as to actuate the subordinate apparatus 38. As the hand 31 continues to move across the scale in the same direction it remains in the elongated light spot for a considerable portion of its movement so as to provide a sustained actuation of the control apparatus 38. Under certain conditions, this sustained actuation is desirable in limit control schemes such as, for example, a system for filling containers by weight wherein the indicating hand is likely to move across the scale with such rapidity that a small spot of light such as is shown in Figure 1 would not actuate the cell sufficient length of time to operate the subordinate control equipment.

Figure 4 illustrates another method of providing the same sustained operation. A meter hand or indicating member 40 is provided with a reflecting surface elongated in the direction of its motion as by providing a flag-like portion 41 extending from one side. The hand 40 is employed in connection with a photoelectric system using a small spot of light such as shown in Figure 1, the elongated reflecting surface operating to provide a sustained actuation of the photoelectric device as the indicating hand moves a considerable distance across its scale.

Figure 5 illustrates a meter scale 44 having a reflecting surface such as a silvered glass mirror having a dark colored hand 45 co-operating therewith to give indications in the usual manner. A light source 46 and a lens 47 direct a small spot of light onto the scale 44 from which it is reflected into a photoelectric cell 48. The hand 45 actuates the cell 48 by intercepting the light beam so as to darken the cell. Inasmuch as a large number of indicating instruments such as electric meters are provided with reflecting scales and black hands, the arrangement of Figure 5 may often be preferred to that of Figure 1.

In Figures 6 and 7 I have illustrated an integrating indicating meter 51 having a number of indicating dials 52. One of the indicating dials is provided with a hand carrying a mirror or suitable reflecting means 54. A light source 55 directs a spot of light into one portion of the path of motion of the mirror 54, and a photoelectric cell 56 is arranged to receive the light when intercepted and reflected by the mirror 54. A suitable closure covers the light source 55 and the light responsive device 56 together with the face of the meter 51. A window 63 in the front of the closure permits the dials of the meter to be read by the light of the light source 55. Connected to the photoelectric cell is a suitable amplifier 58 and an electrically operated counting device 60 which may be located in any desirable place as, for example, some point at considerable distance from the meter. In operation the hand of the integrating meter revolves, carrying with it the mirror 54. Once each revolution the mirror intercepts the beam of light from the light source 55 and directs the same into the photoelectric cell 56 to actuate the counting device 60. Thus, the number of revolutions of the mirror 54 is indicated by the counting device 60 so that the reading of the meter 51 may be ascertained by a mere reading of the indication of the counter 60. This may be particularly desirable where a number of meters are scattered throughout a system and it is desired to provide indications of their readings at a central control point.

It will thus be seen that my present invention provides a simple and effective method of adapting an accurate and sensitive indicating instrument for use as an automatic control device, and that it further provides a device which may be readily attached to instruments and meters already in service.

While I have illustrated certain specific embodiments of my present invention, it will be apparent to those skilled in the art that the same is capable of many modifications and variations. I therefore do not wish to be limited to the specific disclosure but wish to be limited only by the scope of the appended claims.

I claim:

1. The combination with an indicating instrument having a movable part and a scale co-operating therewith, of means for directing light against said scale to be reflected thereby and light responsive means for receiving the reflected light, said movable part being operable to intercept said light upon giving a predetermined indication, whereby to diminish the illumination of said light responsive means in response to said indication.

2. The combination with an indicating instrument having a movable indicating hand and a reflecting scale cooperating therewith, of light responsive means, means for directing a beam of light to said scale to be reflected thereby to said light responsive means, said movable indicating hand being operable to substantially interrupt said beam of light in response to a predetermined indication.

3. In a device adapted to be attached to an indicating meter having a face which includes an indicating hand and a scale with different light reflecting properties, the combination of a casing adapted to be secured to said meter, a support mounted in said casing and rotatable substantially about the axis of rotation of said indicating hand, a light responsive cell and a light source carried on said support, said light source being arranged to direct a beam of light across the path of motion of said hand onto said scale to be intercepted by said hand in response to a predetermined indication of said meter and to be reflected by the face of said meter to said light responsive cell according to the reflecting properties of said face so that said light responsive cell is illuminated in accordance with the movement of said hand over said scale, and means permitting a manual rotation of said support.

4. In a device adapted to be attached to an indicating meter having a face which includes an indicating hand and a scale, said scale and hand having different light reflecting properties, the combination of a casing adapted to be secured to the front of said meter, a window in the front of said casing to permit a view of the face of said meter therethrough, and a light responsive cell and a light source in said casing, said light source being arranged to direct a strong beam of light across the path of motion of said hand onto said scale to be intercepted by said hand in response to a predetermined indication of said meter and to be reflected by the face of said meter to said light responsive cell according to the reflecting properties of said face so that said light responsive cell is illuminated thereby in accordance with the movement of said hand over said scale, said light source also being arranged to cast a weak flood of light on the face of the meter to permit a visual reading thereof.

5. In a device adapted to be attached to a meter having an indicating hand and a scale, said scale and hand having different light reflecting properties, the combination of a casing adapted to be attached to the front of said meter, a window in the front of said casing to permit a view of the face of said meter therethrough, a support mounted in said casing and rotatable substantially about the axis of rotation of said indicating hand, a light responsive cell and a light source carried on said support, said light source being arranged to direct a strong beam of light across the path of motion of said hand onto said scale to be intercepted by said hand substantially in response to a predetermined indication of said meter and to be reflected to said light responsive cell by said scale substantially in response to any other indication of said meter, said light source also being arranged to cast a weak flood of light on the face of the meter to permit a visual reading thereof, and means permitting a manual rotation of said support.

ARCHIE J. McMASTER.